United States Patent [19]

Kelley, Jr.

[11] 4,028,614

[45] June 7, 1977

[54] HIGH SPEED CONTROL OF REACTIVE POWER FOR VOLTAGE STABILIZATION IN ELECTRIC POWER SYSTEMS

[75] Inventor: Fred William Kelley, Jr., Media, Pa.

[73] Assignee: General Electric Company, Philadelphia, Pa.

[22] Filed: May 3, 1976

[21] Appl. No.: 682,544

[52] U.S. Cl. .............................. 323/102; 323/119; 323/127

[51] Int. Cl.² ...................................... H02J 3/18

[58] Field of Search ................ 13/12; 219/10.77; 323/8, 101, 102, 105, 106, 108–110, 119, 127, 128

[56] References Cited

UNITED STATES PATENTS

| 2,652,529 | 9/1953 | Alexanderson | 323/101 |
| 3,936,727 | 2/1976 | Kelley et al. | 323/102 |
| 3,963,978 | 6/1976 | Kelley et al. | 323/102 |
| 3,983,469 | 9/1976 | Brown | 323/8 X |

Primary Examiner—A. D. Pellinen
Attorney, Agent, or Firm—William Freedman

[57] ABSTRACT

In a multiphase alternating current electric power system subject to erratic and unbalanced reactive load current demand, reactive load current compensation is provided by a balanced multiphase reactive compensating impedance having equal but limited reactive current capability in all phases. To increase reactive current capability of any one selected phase of the reactive compensator in response to severe load unbalance a supplementary single phase compensating impedance is connected through a load current controlled switching bridge in parallel circuit relation with any one phase arm of the multiphase compensator. When any one such parallel connection is operative the switching bridge is prevented from connecting the supplementary impedance in any other phase arm of the multiphase compensator.

16 Claims, 4 Drawing Figures

HIGH SPEED CONTROL OF REACTIVE POWER FOR VOLTAGE STABILIZATION IN ELECTRIC POWER SYSTEMS

My invention relates to continuous high speed control of reactive power in electric power systems. For particularly, it relates to static switching control of compensating impedance connected to draw leading or lagging reactive current from an electric power system for stabilization of voltage. The invention is especially applicable to power circuits supplying large and erratic inductive loads, such as arc furnaces.

BACKGROUND

In reactive current compensators it is known to control compensating current magnitude by either variation of compensating reactance or by direct control of current magnitude in fixed reactors. It is also known to provide fixed compensating reactance of one characteristic, as capacitive, and counteracting compensating reactance of opposite characteristic, as inductive, with means for controlling current magnitude in the counteracting reactance, thereby to control the net amount of reactive compensating current. A preferred reactive current compensating apparatus utilizing fixed compensating capacitors and fixed counteracting inductors with conduction angle control of inductive compensating current magnitude is described and claimed in U.S. Pat. No. 3,936,727-Lezan and Kelley. When such apparatus is used with a primarily inductive load the variable current inductive compensating circuit normally requires a maximum current capability only equal to or less than that of the capacitive compensating circuit.

In operation of certain erratic loads however, as three phase electric arc furnaces, certain random conditions of load circuit unbalance may require momentarily a net inductive compensating current in a single power circuit phase only. This requirement may vary in random manner from phase to phase but ordinarily exists in only one phase at any instant. When controlled compensating inductors are used to variably counteract fixed compensating capacitors as described above it is of course possible to provide for a net inductive compensating current in any phase by designing the inductors in all phases with a maximum current capability greater than that of the corresponding compensating capacitors. However, where maximum inductive compensating current is required in only one phase at any one time such a design is unduly expensive. It is desirable therefore that means be provided for increasing the maximum reactive current capability of any one selected phase in a variable multiphase reactive current compensator without increasing the current carrying capability of all phases of the compensator.

SUMMARY OF INVENTION

It is therefore a principal object of my invention to provide reactive current compensating means for a multiphase power circuit wherein the reactive current capability of any one phase of a multiphase compensating impedance may be selectably increased in response to severe load unbalance.

It is another object of my invention to provide control means for selectably coupling reactive current compensating impedance in single phase relation to any one phase of a multiphase power circuit in response to momentary conditions of severe load circuit unbalance.

It is another object of my invention to provide control means for selectably coupling reactive current compensating impedance in single phase relation to any one phase of a multiphase power circuit in response to momentary conditions of severe load circuit unbalance.

It is a more particular object of my invention to provide reactive current compensating means for a multiphase electric power circuit wherein the magnitude of compensating current in each phase is separately controlled by load circuit conditions and supplementary reactive current compensating impedance is selectably connectable in single phase relation to increase available reactive compensating current in any one selected phase of the power system.

My invention is particularly applicable to three phase electric arc furnaces in conjunction with the phase (i.e., conduction angle) controlled reactive current compensator described in the foregoing U.S. Pat. No. 3,936,727. As explained in that patent, an electric furnace load is normally inductive in each phase but is subject to erratic impedance variation and phase unbalance. The compensating reactor normally is required therefore to draw a net capacitive (i.e., leading) current from the line in each phase. To minimize the cost of compensating reactance the current capability of the fixed capacitive compensating reactor is usually made equal to or greater than that of the phase controlled inductive compensating reactor. However in large electric furnaces, particularly with a fresh charge in the furnace, random arc-outs and other erratic unbalances of load impedance may cause severe momentary power circuit unbalance in only one circuit phase at any instant. In the case of an arc-out, one phase section of the compensating reactors may be required to provide net lagging current while the other phases are still required to draw a net leading current.

In carrying out my invention in one preferred embodiment I connect a three phase bank of fixed compensating capacitors in parallel circuit relation with a major inductive load having an erratic impedance characteristic which may become momentarily capacitive in a single circuit phase only, such capacitive load characteristic varying in random manner from phase to phase. To variably counteract the capacitive compensating impedance I connect in parallel circuit relation therewith a three phase bank of delta-connected inductors having a phase controlled static switch in each leg of the delta, thereby separately to control the magnitude of inductive compensating current in each phase of the delta. Since the net amount of reactive compensating current is ordinarily required to be capacitive in each phase I provide compensating inductors in each leg of the delta having a maximum current carrying capability equal to or somewhat less than that of the compensating capacitors in that phase. In order selectably to provide additional inductive compensating current in any one circuit phase I utilize a three phase semiconductor switching bridge to connect a supplementary inductor in single phase shunt relation across any one desired leg of the three phase compensating inductor. The switching bridge is coordinated with control of the three phase inductive compensator to connect the supplementary single phase inductor in a selected circuit phase of the three phase inductive compensator whenever that phase requires a net inductive compensating current capability (i.e., inductive compensating current of a magnitude greater than the capacitive compensating current). Preferably the bridge also controls the magnitude of supplementary inductive compensating current flowing in each half cycle in proportion to the magnitude of excess current demand in the paralleled leg of the three phase inductor.

My invention will be more fully understood and its several objects and advantages further appreciated by referring now to the following description taken in conjunction with the accompanying drawing wherein:

FIG. 1 is a schematic circuit diagram, partially in block form, of a three phase electric power system including phase controlled multiphase reactive current compensating means and supplementary single phase reactive current compensating means embodying my invention, FIG. 2 is a schematic circuit diagram in block form of suitable conduction control and blocking control for the semiconductor switching bridge associated with the supplementary compensating means of FIG. 1, and FIGS. 3 and 4 are fragmentary schematic circuit diagrams showing supplementary compensating inductors suitable for use in the power circuit of FIG. 1 and embodying my invention in alternative forms.

DETAILED DESCRIPTION

Power Circuit Components

Figure 1:
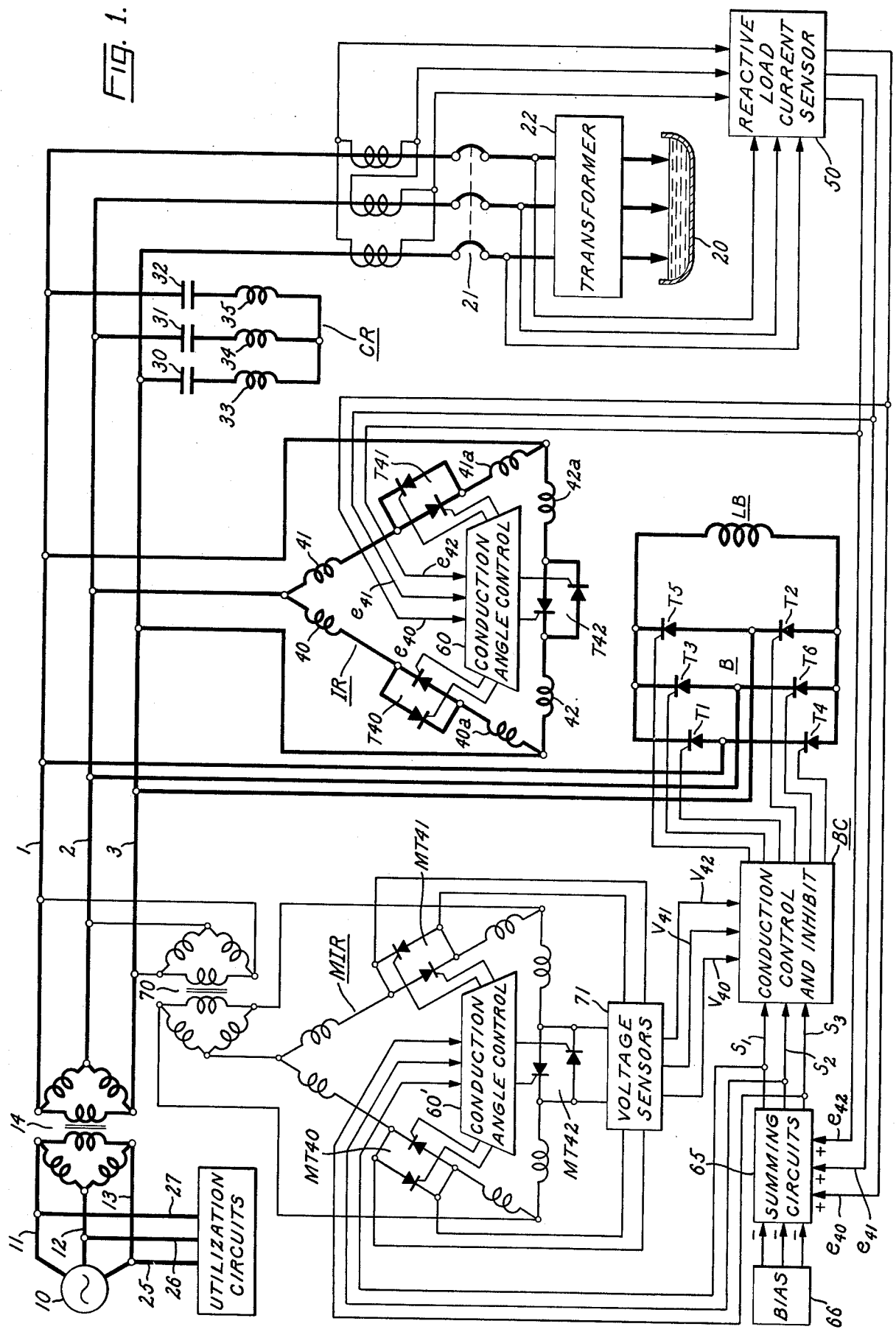

Referring now to the drawing, and particularly to FIG. 1, I have illustrated a three phase electric power system comprising a source of voltage, shown as an alternating current generator 10, connected to transmission line conductors 11, 12, 13. In a typical high voltage power system the transmission line voltage may be of the order of 115 kV or 230 kV stepped up from the generator 10 through line transformers (not shown). Through a step down transformer 14 and three phase bus conductors 1, 2, 3 the transmission line 11, 12, 13 supplies power to a heavy and erratically variable load illustrated as an electric arc furnace 20. The bus conductors 1, 2, 3, hereinafter referred to as the furnace bus, may by way of example provide bus voltage of 34.5 kV. Power is supplied to the arc furnace 20 from the furnace bus through a circuit breaker 21 and a step down transformer 22. In practice the arc furnace load 20 may be made up of one or more three phase arc furnaces. Because of the erratic nature of the arcs in such furnaces load unbalance may at times be severe. In addition, arc-out at any of the furnace electrodes may cause such severe unbalance that the load impedance in any single circuit phase may momentarily appear to be capacitive and this characteristic may vary randomly from phase to phase.

At a selected location on the power system intermediate the generator 10 and the substation transformer 14 a variety of other industrial, commercial and residential load circuits may be connected to the transmission line conductors 11, 12, 13. By way of illustration such other loads have been designated as "utilization circuits" and are shown connected to the lines 11, 12, 13 through conductors 25, 26, 27. It is desirable that voltage upon the conductors 25, 26, 27 should not vary appreciably in magnitude with variations in phase or magnitude of the arc furnace load current. The conductors 25, 26, 27 therefore constitute a "critical voltage supply bus" upon which it is desired to eliminate rapid cyclic voltage variation and consequent lamp flicker as a consequence of rapid cyclic changes in current and power factor at the arc furnace 20.

While it will be understood by these skilled in the art as this description proceeds that my invention is generally applicable to any system of transmission or distribution or to any unique load where it is desired to compensate for, or counteract, reactive load current and thus improve system power factor or the power factor of a particular load, it has particular application to multiphase electric arc furnace loads. An electric arc furnace provides a major load of such magnitude and electrical characteristics that it generally produces appreciable low frequency system voltage variation and consequent objectionable lamp flicker in other loads on the system. It will be evident however that the invention is applicable to power factor correction in drag lines, rolling mill drives, long high voltage transmission lines and the like.

The impedance of an electric arc furnace is comprised primarily of resistance and inductance, but line-to-line impedance changes abruptly and erratically with changes in the metling and refining conditions in the furnace. Particularly when a new charge of metal scrap is placed in the furnace the arcs experience abrupt and appreciable physical changes over a period of at least several minutes duration until the furnace charge assumes a more or less homogeneous nature. Arcing current is determined to some extent by a countervoltage developed by the arc itself. This countervoltage is of rectangular wave shape and is in phase with the inherently lagging or inductive arc current. The effective impedance of the arc changes abruptly with the arc geometry and in so doing it changes phase relation with respect to the impressed load voltage. Thus to the external circuit an arc furnace load appears as a variable inductance and variable resistance so long as arcs exist at all the electrodes. It is these characteristics which produce rapidly recurrent changes in the phase and magnitude of load voltage with respect to system voltage and consequent low frequency voltage flicker. The frequency of these voltage variations is a characteristic of the furnace parameters and may be of the order of three to six cycles per second.

In addition to the arc impedance variations discussed above it is not uncommon that with a new charge of metal scrap in a three phase furnace one of the electrode arcs will extinguish. Such arc-out causes severe phase unbalance and is random in respect to the affected electrode. During such intervals a polyphase reactive current compensator may be required momentarily to provide lagging rather than leading compensating current. Thus in a trhee phase compensating arrangement such as shown in the foregoing U.S. Pat. No. 3,936,727 only one phase of the reactive current compensator will be required to draw lagging compensating current at any instant. However, due to the random behavior of electrode arc-out this requirement for lagging compensating current may occur from time to time across any single pair of the three lines in a three phase power supply system.

To meet such maximum single phase demand for inductive compensating current I have shown at FIG. 1 a multiphase reactive current compensator of the type disclosed in my aforegoing joint patent in combination with a supplementary single phase inductor selectably connectable in parallel circuit relation with any one leg of the delta-connected inductive compensator. More specifically, I provide at FIG. 1 a three phase bank of fixed capacitors 30, 31, 32 connected to the furnace bus 1, 2, 3 in star or wye circuit relation through respective tuning inductances 33, 34 35 and designated generally as CR. In each line-to-neutral arm of the capacitor bank the series inductance is selected to tune the capacitive reactor to a selected harmonic of the power system frequency, thereby to by-pass current of that frequency and filter such currents from the power circuit. In order to regulate the compensating effect of the capacitive reactor CR I also connect across the furnace bus 1, 2, 3 in ring or delta circuit relation a three phase inductive reactor IR. The inductive reactor IR comprises three series-connected pairs of fixed inductors 40, 40a, 41, 41a and 42, 42a, connected in delta circuit relation, each arm of the delta including one such pair of inductors in series with an intermediate alternating current thyristor switch. Specifically, the inductive reactor arm 40, 40a includes an intermediate thyristor switch T40; the arm 41, 41a includes an intermediate thyristor switch T41 and the arm 42, 42a includes an intermediate thyristor switch T42. As is well known to those skilled in the art, each such thyristor switch comprises a pair of thyristors, or a pair of thyristor groups, connected in inverse parallel relation to conduct opposite half cycles of an alternating current. In the inductive reactor IR the inductors are connected in delta circuit relation primarily in order to minimize the current requirements of the thyristors and reactors. When the system is balanced the delta connection serves also to short circuit third harmonic currents and thus aids in eliminating them from the power lines.

In the power circuit thus far described both the capacitive compensating reactor CR and the inductive compensating reactor IR are balanced three phase networks; i.e., each such reactor has the same impedance and current carrying capability in all phases. In addition, the line-to-line capacitance of the reactor CR is equal to the line-to-line inductance of the reactor IR. Accordingly, when the phase-controlled thyristor switches T40, T41, T42 are fully conductive the leading reactive current drawn by the reactor CR is fully counteracted by the lagging reactive current drawn by the reactor IR. As described in the prior patent 3,936,727, the lagging reactive current in each circuit phase of the reactor IR is phase controlled (i.e., regulated in magnitude by conduction angle control) in each half cycle of power frequency and in proportion to the magnitude of the reactive current in one phase of the furnace load circuit 20. Thus a regulated net amount of leading reactive current is drawn by the combination of the reactors CR and IR and maintained substantially equal and opposite to the normally lagging reactive current in the load circuit. Such regulation is carried out separately in each circuit phase or arm of the inductive reactor IR by the switches T40, T41, T42 so that total line current in the furnace bus 1, 2, 3 is balanced and substantially in phase with bus voltage.

Basically, compensating current regulation of the reactor IR is accomplished in response to reactive load current signals derived in a Reactive Load Current Sensor 50 to which current and voltage signals from the furnace bus 1, 2, 3 are supplied. The Sensor 50 may be of the type described in the foregoing U.S. Pat. No. 3,936,727. Positive unidirectional phase related signals $e_{40}$, $e_{41}$, $e_{42}$ from the Sensor 50 are supplied to a Conduction Angle Control circuit 60 which controls the gating angles of the thyristor switches T20, T41, T42 in the manner described in U.S. Pat. No. 3,936,727. The Conduction Angle Control 60 is preferably of the type described and claimed in U.S. Pat. No. 3,936,726-Kelley. Preferably, the Conduction Angle Control 60 is supplied also with phase angle control signals in accordance with U.S. Pat. No. 3,936,727, but for simplification such phase angle control is not illustrated nor further described in the present application.

In order selectably to increase the reactive current carrying capability of any one selected phase arm of the delta-connected inductive compensating reactor IR beyond the "full on" current through switch T40, T41, or T42, I provide a supplementary compensating inductor LB controlled by a semiconductor switching bridge B. The switching bridge B is suitably gated to connect the supplementary reactor LB in parallel single phase circuit relation across any one selected arm of the inductive reactor IR and to regulate the magnitude of supplementary compensating current in the reactor LB by conduction angle phase control and in proportion to the demand for additional reactive current in the paralleled phase of the reactor IR. By "additional" current in any phase arm of IR I mean current in excess of that conducted through a switch T40, T41 or T42 when "full on".

The switching bridge B comprises 6 thyristors T1 –T6, connected in bridge circuit relation in a manner well understood by those skilled in the art. Such connection comprises three forward thyristors, or thyristor groups, T1, T3, T5 connected respectively between the furnace bus conductors 1, 2, 3 and one terminal of the supplementary inductor LB and three reverse thyristors, or thyristor groups, T4, T6 and T2 connected respectively between the bus conductors 1, 2, 3 and the other terminal of inductor LB.

Control and Operation

Control of the thyristors T1 – T6 in the bridge B is accomplished essentially by utilizing the positive conduction angle signals from the Load Current Sensor 50 in combination with predetermined negative bias signals to derive positive differential signals for triggering a selected forward pair and a cooperating reverse pair of thyristors in the bridge B whenever one of the conduction angle signals from Sensor 50 exceeds in magnitude the level at which it calls for full conduction in the associated arm of inductive reactor IR. The operative pairs of bridge thyristors are then phase controlled in accordance with the magnitude of the differential signal to regulate the magnitude of current through the supplementary inductor LB in proportion to the additional current demand in the associated arm of the reactor IR. Whenever the inductor LB is thus connected across any one arm of reactor IR suitable inhibiting means are operable to prevent the switching bridge B from connecting it across any other arm of reactor IR.

At FIG. 1 I have shown, partially in block form, a suitable control for the thyristor switching bridge B responsive to the positive conduction angle signals $e_{40}$, $e_{41}$, $e_{42}$ supplied by the Signal Sensor 50 to the Conduction Angle Control 60 in the inductive compensating reactor IR. The same phase related conduction angle signals $e_{40}$, $e_{41}$, $e_{42}$ are also furnished to phase related summing circuits 65 in opposing relation to negative bias signals for each phase from a bias source 66. Phase related differential control signals $S_1$, $S_2$, $S_3$ which represent the differential outputs of the summing circuits 65 are supplied to Conduction Control and Inhibit circuits designated generally as BC. supplies Preferably the Conduction Angle Control BC for the switching bridge B is of the type illustrated in my foregoing U.S. Pat. No. 3,936,726. Such Conduction Angle Control requires voltage signals proportional to the voltages appearing across the thyristor switches T40, T41, T42, of the reactor IR in the power circuit. Valve voltage signals from IR cannot be used directly in the Conduction Control BC. To derive suitable valve voltage signals I provide a delta-connected, thyristor controlled, inductive reactor MIR which is a low voltage duplicate, or mimic, of the compensating reactor IR. The mimic reactor MIR is energized at low control voltage through a step-down transformer 70 and is phase controlled by the same differential conduction angle signals $S_1$, $S_2$, $S_3$ which control the Bridge B through Control BC. For this purpose the mimic reactor MIR includes a Conduction Angle Control 60' similar to the Conduction Angle Control 60 in the reactor IR. From the mimic reactor MIR valve voltages across thyristor switches MT40, MT41, MT42 are supplied to suitable voltage Sensors 71 which supplies input signals $V_{40}$, $V_{41}$, $V_{42}$ to the Conduction Angle Control BC.

Output signals from Conduction Angle Control BC are supplied to the gating electrodes of the bridge thyristors T1 – T6 and serve to trigger into conduction the appropriate forward and reverse pairs of such thyristors whenever any one of the conduction angle signals $e_{40}$, $e_{41}$, $e_{42}$ supplied to the Summing Circuits 65 exceeds the associated negative bias signal. The bias signals are of such magnitude that a positive differential signal $S_1$, $S_2$ or $S_3$ exists only when one of the conduction angle signals $e_{40}$, $e_{41}$, $e_{42}$ is greater in magnitude than is required for full conduction of the associated thyristor switch T40, T41, or T42 in the inductive compensating reactor IR. The thyristor pairs so triggered are then phase controlled to conduct current proportional in magnitude to the magnitude of the operative differential signal, thereby to control the magnitude of current through the supplementary inductor LB in proportion to degree of demand for reactive compensating current in excess of the "full on" current then being carried by the paralleled arm of the compensating reactor IR. For example, when the conduction angle signal $e_{40}$ exceeds in magnitude that required for full conduction of the associated thyristor switch T40 in the reactor IR a pair of "forward" bridge thyristors T3, T2 and a pair of "reverse" bridge thyristors T6, T5 are triggered into conduction. In like manner appropriate forward and reverse pairs of bridge thyristors T1 – T6 are triggered into conduction when lagging reactive current greater than full conduction current is required by other phase arms of the inductor IR in accordance with the table below. The table shows which forward and reverse pairs of thyristors in the switching bridge B are triggered for connection of the supplementary inductor LB in single phase relation across each arm of the three phase compensating reactor IR, the several arms of the inductor IR being identified by their thyristor switches T40, T41, T42.

| Reactor IR Arm | Bridge B Switches | |
| --- | --- | --- |
| | F | R |
| T40 | T3, T2 | T5, T6 |
| T41 | T1, T6 | T3, T4 |
| T42 | T1, T2 | T5, T4 |

It will of course be understood that in each connection illustrated in the foregoing table conduction of a "forward" conducting pair of bridge thyristors and a "reverse" conducting pair is synchronized with "forward" and "reverse" conductions, respectively, through the associated thyristor switch T40, T41, or T42 of reactor IR.

When any selected forward and reverse pairs of bridge thyristors are conducting in accordance with the foregoing table to connect the supplementary inductor LB in parallel circuit relation with one selected arm of the inductive reactor IR it is necessary that conduction be inhibited in other pairs of bridge thyristors, so that only one single phase parallel connection of the inductor LB may be completed at any one time. At FIG. 2 I have illustrated in block form the three phase gating control and inhibiting circuits constituting the Conduction Control and Inhibit device BC of FIG. 1.

Figure 2:
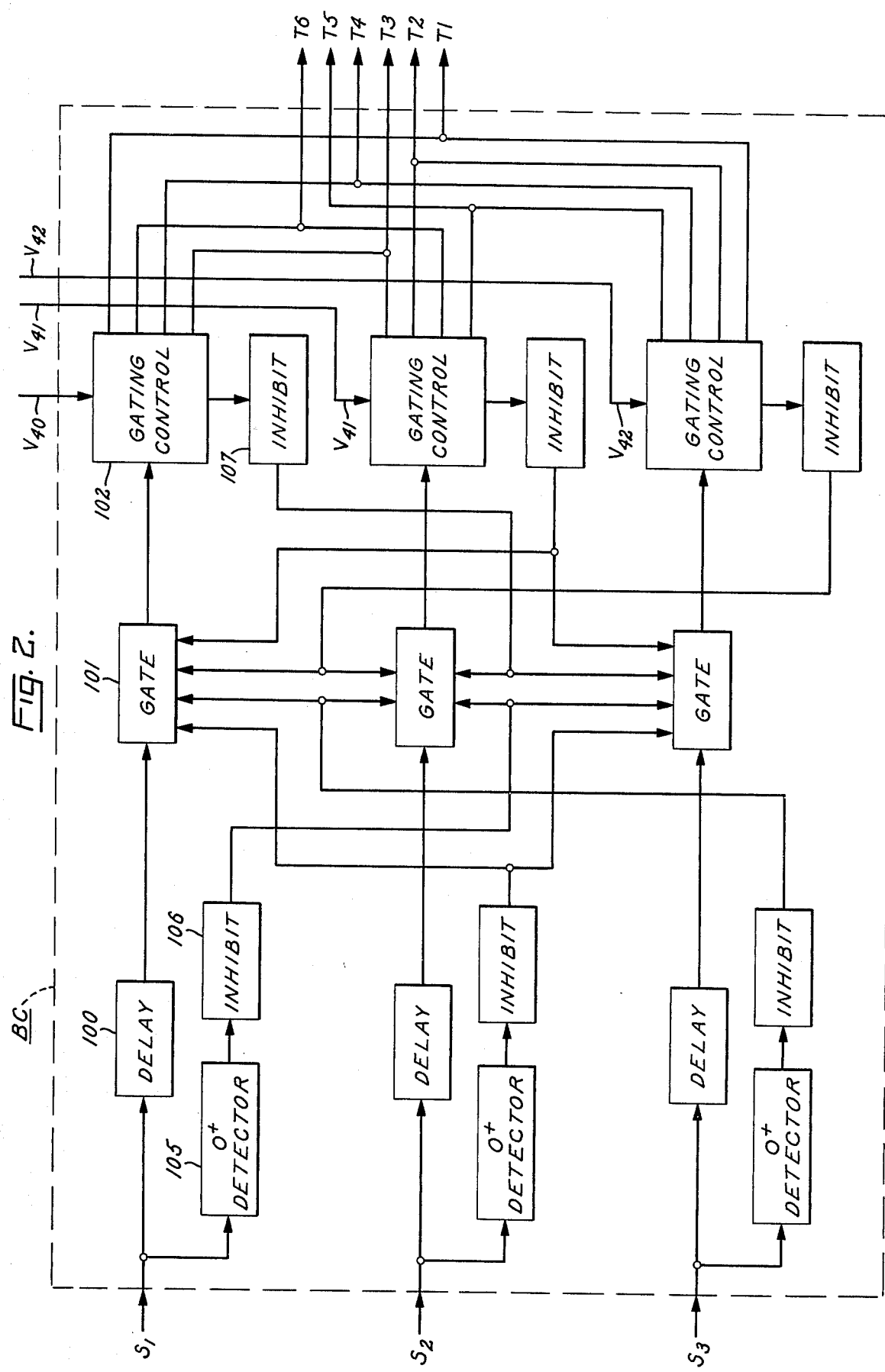

In FIG. 2 the differential conduction signals $S_1$, $S_2$, $S_3$ are supplied through separate phase-related gating channels to control appropriate gating electrodes of the bridge thyristors T1 – T6. The signal channel for $S_1$ controls the bridge thyristor pairs associated in the foregoing tabulation with thyristor switch T41 of the compensating inductor IR; the signal channel for $S_2$ controls the bridge thyristor pairs associated with thyristor switch T40 of inductor IR; the signal channel for $S_3$ controls the bridge thyristor pairs associated with thyristor switch T42 of the inductor IR. In each of these three phase-related channels the incoming signal $S_1$, $S_2$ or $S_3$ is supplied through a suitable delay circuit 100 and a gating circuit 101 to a gating control 102 similar to that shown in my foregoing U.S. Pat. No. 3,936,726. The output of each gating control 102 controls the bridge thyristor pairs associated with one phase arm of reactor IR, as shown in the above table and indicated on the drawing at FIG. 2.

In each signal channel of FIG. 2 the gates 101 are normally open to permit transmission of a differential conduction control signal $S_1$, $S_2$ or $S_3$, but each is closed in the presence of an incoming or outgoing signal on either or both the other signal channels, so that only one gating control 102 can be effective at any instant. For this purpose each signal channel detects positive-going input signals through a conventional Zero Crossing Detector 105 the output of which initiates action of an inhibiting circuit 106. In each of the signal channels shown at FIG. 2 the inhibiting circuit 106 functions to close, or block, the gates 101 of the other two signal channels. In like manner whenever the gating control 102 of any one signal channel is providing an output signal to its associated bridge thyristors it also energizes an associated inhibit circuit 107 the output of which blocks the gates 102 of the other two signal channels.

It will now be understood by those skilled in the art that in operation, when any one conduction angle control signal $e_{40}$, $e_{41}$ or $e_{42}$ exceeds in magnitude the level at which full thyristor conduction occurs in the associated arm of the inductor IR, that signal will overcome the associated bias signal in the phase-related Summing Circuits 65, thereby to provide a differential signal $S_1$, $S_2$ or $S_3$ to one channel of the Conduction Angle Control BC (FIG. 2). For example, if the conduction control signal $e_{41}$ exceeds in magnitude the positive signal level which results in full conduction of the thyristor switch T41 the amount by which the actual signal exceeds the "full conduction" level proportionately represents a demand for additional current in the arm 41, 41a of the inductor IR. Applied to the Summing Circuits 65 this high level signal results in a differential signal $S_1$, proportional in magnitude to the amount by which the signal $e_{41}$ exceeds its "full conduction" magnitude. The differential signal $S_1$ is applied to the normally open gate 101 of its associated signal channel (FIG. 2) to trigger the gating electrode of forward and reverse pairs of bridge thyristors T1, T6 and T4, T3, thereby to connect the supplementary inductor LB in parallel single phase circuit relation with the inductors 41, 41a in one arm of the inductive compensator IR. The presence of this signal in the signal channel $S_1$ (FIG. 2) immediately blocks the signal channels of $S_2$ and $S_3$. The differential signal $S_1$ also operates through the gating control circuit 102 of that channel to phase control conduction through the supplementary inductor LB so that current through the supplementary inductor LB is proportioned in magnitude in accordance with the amount by which signal $e_{41}$ exceeds its full conduction level (i.e., is proportioned to the demand for additional inductive current in the arm 41, 41a of the inductor IR). As previously pointed out, this additional inductive compensating current then exceeds the capacitive compensating current in the associated arm of the capacitive reactor CR, so that the net compensating current in that circuit phase will be lagging rather than leading.

There exists of course the possibility that more than one phase of the load circuit will momentarily draw leading reactive current so that more than one phase of the reactor IR is called upon to supply lagging current in excess of its "full on" current capability. Such demand is evidenced when two or more of the conduction angle signals $e_{40}$, $e_{41}$, $e_{42}$ exceeds its "full on" level. In that event at least two differential signals $S_1$, $S_2 S_3$ are present at the input of the bridge Conduction Control BC. It will now be evident from FIG. 2 that as a consequence of the cross-channel blocking provided to the several gates 101, the presence of two or more differential input signals blocks all channels of the Control BC so that the supplementary inductor LB becomes or remains isolated and is not connected in any phase arm of reactor IR.

Figure 3:
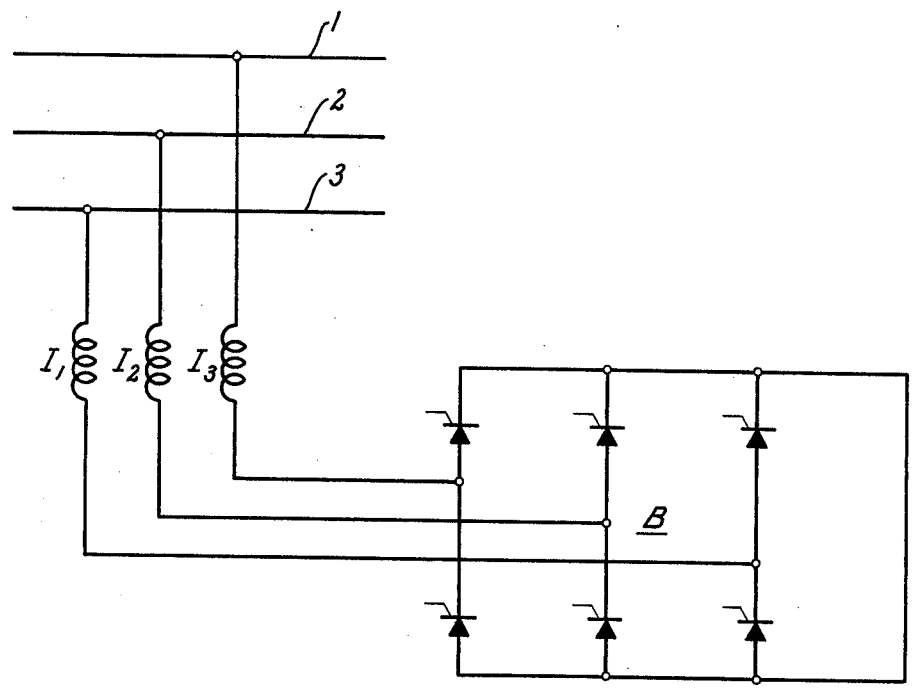

At FIG. 3 I have shown another embodiment of my invention wherein supplementary inductors $I_1$, $I_2$, $I_3$ which correspond functionally to the single phase supplementary inductor LB of FIG. 1 are connected in wye circuit relation on the input side of the thyristor switching bridge B, with the output terminals of the bridge connected directly together. In this case the three wye-connected inductors $I_1$, $I_2$, $I_3$ are so controlled by the thyristor bridge B that one pair of such inductors will be connected in series circuit relation across one arm of the inductive compensator IR, thereby to complete a single phase connection of supplementary inductors in a manner similar to connection of the single inductor LB of FIG. 1. It will of course be understood by those skilled in the art that the thyristor bridge B of FIG. 3 is controlled in the same manner previously described with respect to FIG. 1.

Figure 4:
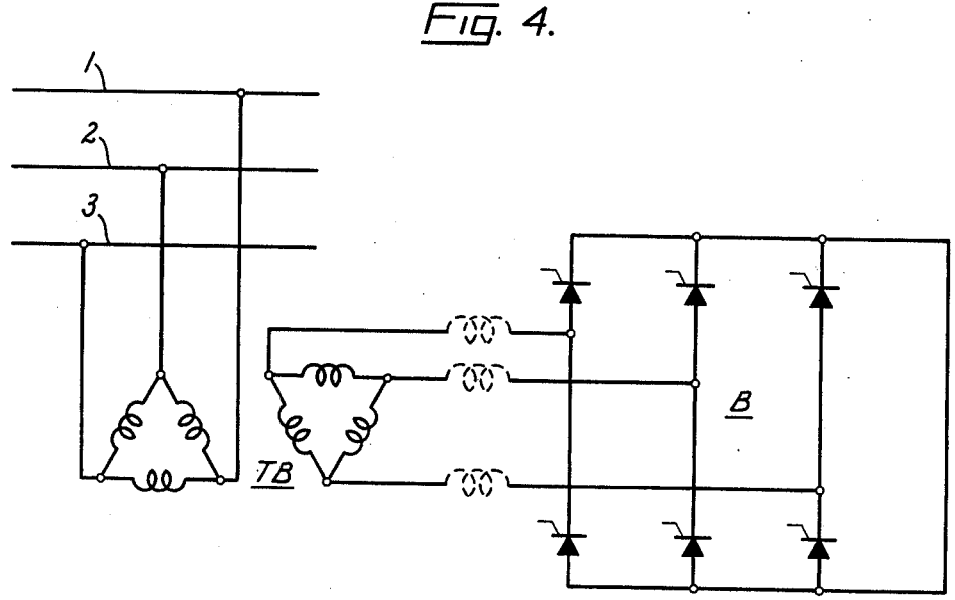

At FIG. 4 I have shown still another embodiment of my invention in which the thyristor bridge B is connected to the three phase furnace bus 1, 2, 3 through a transformer TB with no discrete supplementary inductor in circuit. In this case operation is similar to that of FIG. 3 with the leakage inductance of the transformer (shown in phantom illustration at FIG. 4) functioning in the same manner as the wye-connected supplementary inductors $I_1$, $I_2$, $I_3$ of FIG. 3.

It will now be evident to those skilled in the art that my single phase supplementary, bridge controlled compensating reactor for connection in any selected phase arm of a multiphase compensating reactor may be connected in any such phase arm of either like or opposite reactive characteristic. Moreover such connection may be utilized with or without control of current in the supplementary reactor, by conduction angle or otherwise; it may be utilized whether or not the multiphase reactor provides for multiphase control of reactive current. Where multiphase control of reactive current is provided my supplementary single phase reactor is useful with both direct and counteraction types of compensating control and in both variable reactance and conduction angle control modes.

While I have shown and described only certain preferred embodiments in my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. Reactive current compensating apparatus for a three phase alternating current electric power circuit having load terminals and supply conductors subject to varying and unbalanced reactive current demand at said load terminals which comprises; three phase reactive impedance means connected to said supply conductors, said three phase impedance means providing equal reactive current carrying capability in each phase of said power circuit and drawing from said supply conductors a compensating reactive current substantially equal in magnitude and opposite in phase with respect to reactive current at said load terminals, supplementary single phase reactive impedance means, a three phase static switching bridge for selectably connecting said single phase impedance means in parallel circuit relation with any one phase arm of said three phase impedance means, said switching bridge including gating means for determining said selectable connection thereby selectably to increase the reactive compensating current capability connected to one phase only of said power circuit, and means responsive to reactive current in an electric load connected to said load terminals for controlling said switching bridge.

2. Reactive current compensating apparatus according to claim 1 which additionally includes means responsive to reactive load current in each circuit phase for phase controlling said gating means thereby to control the magnitude of current traversing said single phase impedance means.

3. Reactive current compensating apparatus according to claim 1 which additionally includes, means responsive to reactive current in each phase of said electric load for controlling the compensating reactive current in respective phases of said three phase impedance means, said compensating reactive current in each phase of said three phase impedance means being controllable within a predetermined limited range of magnitude, said reactive load current responsive means also phase controlling said gating means to vary reactive compensating current in said single phase impedance means in proportion to load current demand in a selected circuit phase for reactive compensating current beyond said predetermined range of magnitude.

4. Reactive current compensating apparatus for a multiphase alternating current electric power circuit having load terminals and supply conductors subject to varying and unbalanced reactive current demand at said load terminals which comprises; balanced multiphase capacitive impedance means connected in said power circuit, balanced multiphase inductive impedance means connected in parallel circuit relation with said capacitive impedance means, said capacitive and inductive multiphase impedance means drawing from said power circuit a net amount of reactive compensating current, one said multiphase impedance means being controllable variably to counteract the other and having a predetermined maximum reactive current capability supplementary single phase reactive compensating impedance means, switching means for selectably connecting said single phase impedance means in parallel circuit relation across any one selected phase arm of the multiphase impedance means of like reactance thereby to extend beyond said maximum the reactive current capability of said one phase arm, and means responsive to the reactive component of load current in each phase of a multiphase electric load connected to said load terminals for controlling said switching means.

5. Reactive current compensating apparatus according to claim 4 wherein said multiphase inductive impedance means is controllable to vary the magnitude of inductive compensating current therein, said multiphase capacitive impedance means is fixed and said single phase supplementary impedance means is inductive.

6. Reactive current compensating apparatus according to claim 5 wherein said multiphase inductive impedance means comprises a plurality of arms each including fixed inductance and gate controlled thyristor switching means for separately controlling the magnitude of inductive compensating current in each said phase arm, said apparatus including also means responsive to the reactive component of load current in each phase of said electric load for controlling said gating means in associated phases of said three phase inductive impedance means.

7. Reactive current compensating apparatus according to claim 6 wherein said switching means for said single phase impedance means is a multiphase thyristor bridge including gating means and said reactive load current responsive means phase controls said gating means synchronously with phase control of the thyristor switching means in the paralleled phase arm of said multiphase impedance means.

8. Reactive current compensating apparatus according to claim 4 wherein said single phase compensating impedance means comprises a reactive impedance element connected between each said supply conductor and the input side of said switching bridge, said switching bridge connecting selected pairs of said impedance elements in single phase series circuit relation across a selected phase arm of one said balanced impedance means.

9. Reactive current compensating apparatus according to claim 4 which additionally includes means operable upon connection of said single phase impedance means across one said phase arm to render said switching means non responsive to reactive load current signals in any other circuit phase.

10. Reactive current compensating apparatus according to claim 4 which additionally includes means responsive to excess reactive current demand from more than one phase of said load circuit for disabling said switching means.

11. Reactive current compensating apparatus for a three phase alternating current electric power circuit having load terminals and supply conductors subject to varying and unbalanced reactive current demand at said load terminals which comprises; balanced three phase capacitive impedance means and balanced three phase inductive impedance means connected in said power circuit draw net reactive current compensating reactive load current, each said three phase impedance means having a predetermined limited range of reactive current capability, and one said three phase impedance means being controllable variably to counteract the other, supplementry single phase reactive impedance means, switching means for selectably connecting said single phase impedance means in parallel circuit relation across one selected phase arm of one said three phase impedance means thereby to modify the range of reactive current capability of said one phase arm, and means responsive to the reactive component of load current in each phase of a three phase electric load connected to said load terminals for controlling said switching means.

12. Reactive current compensating apparatus for a miltiphase alternating current electric power circuit having load terminals and supply conductors subject to varying and unbalanced reactive current demand at said load terminals which comprises; balanced multiphase reactive compensating impedance means connected to said supply conductors, said balanced compensating impedance means providing equal reactive current carrying capability in each phase of said power circuit, alternating current static switching means in each phase arm of said balanced impedance means, each said static switching means including first gating means for varying the conduction angle of said switching means thereby to control within a predetermined limited range the magnitude of reactive compensating current traversing the associated phase arm of said balanced impedance means, supplemental single phase reactive compensating impedance means, a multiphase static switching bridge for selectively connecting said single phase impedance means in parallel circuit relation with any one phase arm of said balanced impedance means thereby to extend the reactive current capability of said one phase, said bridge including second gating means for controlling said selectable connection and varying the conduction angle of said bridge thereby to control the magnitude of supplemental reactive compensating current traversing said single phase impedance means, means for generating a group of individual signals representative in each half cycle of power circuit frequency of the reactive component of current in each phase of an electric load connected to said load terminals, means individually responsive to each said signal for so controlling said first and second gating means that the net reactive compensating current in each phase of said power circuit is substantially equal and opposite to reactive current in the respective phases of said electric load, and means responsive to connection of said single phase impedance means in parallel with any one of said phase arm to block response of said second gating means to reactive load current signals associated with any other power circuit phase.

13. Reactive current compensating apparatus according to claim 12 wherein the means for controlling said second gating means comprises a summing circuit for each power circuit phase differentially responsive to one said reactive load current signal and a bias signal for generating phase related differential current signals, each said differential current signal having a magnitude proportional to reactive compensating current demand in the associated power circuit phase in excess of the maximum reactive current capability of said balance compensating impedance means.

14. Reactive current compensating apparatus according to claim 13 wherein said means for controlling said second gating means in response to said differential signals comprises separate signal channels for each phase of said power circuit and each said signal channel comprises; a normally open signal transfer gate having input, output and blocking circuits; delay means for supplying one said differential signal to said input circuit, gating control means connected to said output circuit for controlling the conduction angles of selected static switching means in said bridge associated with connection of said single phase compensating impedance means in the power circuit related to said one differential signal, and means responsive to presence of the associated differential signal for actuating said blocking circuits in all other signal channels.

15. Reactive current compensating apparatus according to claim 14 which includes also means responsive to actuation of said gating control means in any one said signal channel for actuating said blocking circuits in all other signal channels.

16. Reactive current compensating apparatus according to claim 13 wherein said blocking means comprises means responsive to the presence of more than one differential current signal for disabling said second gating means thereby to isolate said single phase compensating impedance.

* * * * *